(No Model.)  2 Sheets—Sheet 1.

H. FLETEMEYER.
Combined Flour Sifter and Safe.

No. 239,753. Patented April 5, 1881.

Witnesses:
Frank M. Burnham
J. McHamu

Inventor:
H. Fletemeyer
By H. J. Ennis,
atty.

(No Model.) 2 Sheets—Sheet 2.

H. FLETEMEYER.
Combined Flour Sifter and Safe.

No. 239,753. Patented April 5, 1881.

Witnesses:
Frank M. Burnham
J. McNamee

Inventor:
H. Fletemeyer
By H. J. Ennis, Atty.

UNITED STATES PATENT OFFICE.

HARMAN FLETEMEYER, OF PEORIA, ILLINOIS.

COMBINED FLOUR SIFTER AND SAFE.

SPECIFICATION forming part of Letters Patent No. 239,753, dated April 5, 1881.

Application filed September 11, 1880. (No model.)

*To all whom it may concern:*

Be it known that I, HARMAN FLETEMEYER, a citizen of the United States, residing at Peoria, in the county of Peoria and State of Illinois, have invented certain new and useful Improvements in Combined Flour Sifter and Safe; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention has relation to a combined flour sifter and safe; and it consists in the improvements in the construction of the same hereinafter fully described, and particularly pointed out in the claim.

Figure 1:
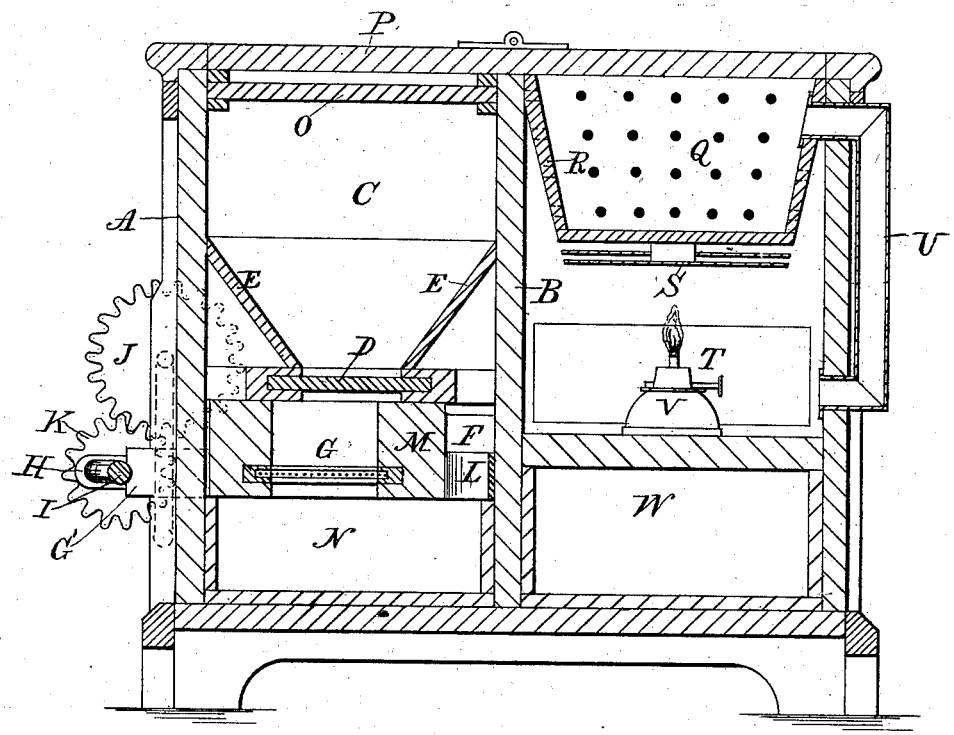
Figure 2:
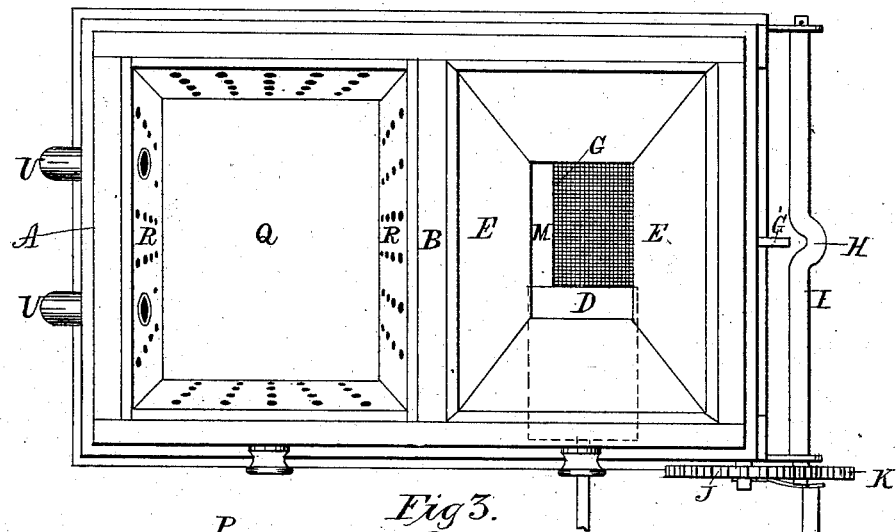
Figure 3:
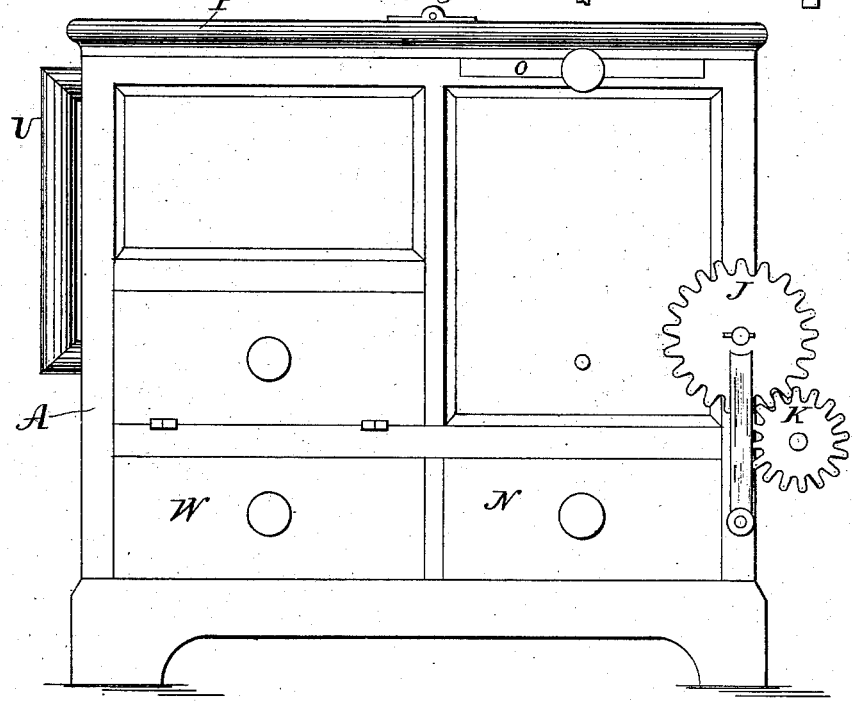

Figure 1 is a vertical longitudinal sectional view of a device embodying the improvements in my invention. Fig. 2 is a plan view of the same, and Fig. 3 is a front elevation.

Referring by letter to the drawings, A designates the casing of the box or chest in which the operative parts of the device are located.

B designates a partition dividing the sifter-compartment from the safe-compartment.

In the sifter-compartment I provide a flour-bin, C, having a sliding bottom, D, at the termination of its converging sides E.

Beneath the flour-bin C, I provide a sieve-compartment, F, in which is placed a reciprocating sieve, G, its frame having an arm, G', projecting through the casing, which is driven inward by a cam, H, on a shaft, I, operated by a crank-gear, J, and a pinion, K, and is forced out by a spring, L, placed between the partition B and the rear face of the sieve-frame M.

Beneath the sieve-compartment F is located a drawer, N, to receive the sifted flour, and from which the latter is taken when needed for use.

For convenience in kneading and raising the dough I have provided a kneading-board, O, at the top of the bin C, or the cover P of the casing A, which is hinged over the partition B, may be upturned and used for the purpose.

In order to facilitate the raising of the dough I have provided a receptacle, Q, for the same, having converging perforated sides R to leave a space around it in the safe-compartment.

Beneath the receptacle Q and depending from the bottom of the same is a duplex metallic deflector, S, and beneath this duplex deflector is a lamp-compartment, T.

Connecting the interior of the receptacle Q and the lamp-chamber T are two pipes, U, for conveying the heated air from the receptacle Q back to the lamp-chamber T, thereby accelerating the rising of the dough in the receptacle Q.

V designates the lamp for the lamp-chamber, and W is a drawer for the reception of bread or the like.

Having thus fully described my invention, what I claim as new, and desire to secure by Letters Patent of the United States, is—

In a combined flour sifter and safe, the combination of the flour-bin C, provided with the converging sides E and sliding bottom D, with the sieve G in the frame M, having the arm G', the shaft I, having the cam H and pinion K, the crank-gear J, and the spring L, constructed and operating substantially as and for the purposes set forth.

In testimony whereof I affix my signature in presence of two witnesses.

HARMAN FLETEMEYER.

Witnesses:
M. C. DARBY,
H. G. BELCKE.